O. R. BERGER.
COOKING UTENSIL.
APPLICATION FILED JULY 15, 1915.
1,200,917. Patented Oct. 10, 1916.
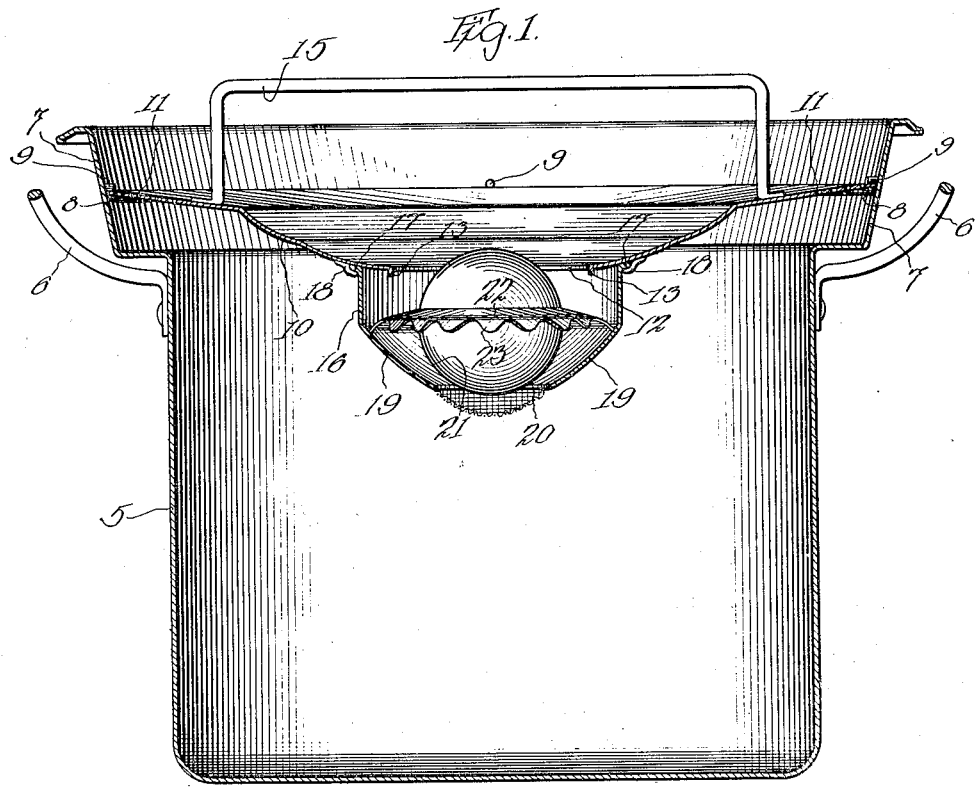
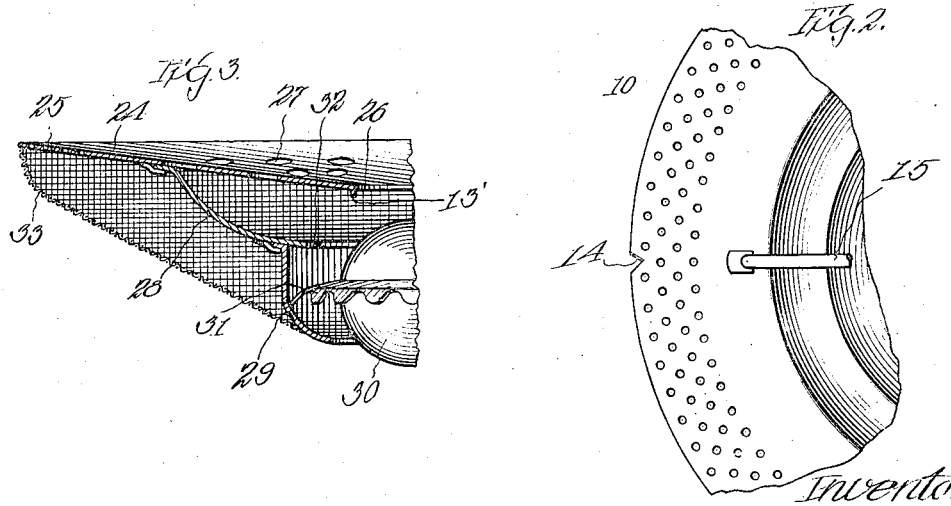

UNITED STATES PATENT OFFICE.

OTTO R. BERGER, OF CHICAGO, ILLINOIS.

COOKING UTENSIL.

1,200,917.  Specification of Letters Patent.  Patented Oct. 10, 1916.

Application filed July 15, 1915.  Serial No. 39,953.

*To all whom it may concern:*

Be it known that I, OTTO R. BERGER, a subject of the Emperor of Germany, residing at Chicago, in the county of Cook and State of Illinois, have invented certain new and useful Improvements in Cooking Utensils, of which the following is a specification.

This invention relates to cooking utensils but is more particularly designated as means for preventing the boiling over of liquid in a cooking vessel, and the principal object of the invention is to provide a new and improved construction, combination and arrangement of parts by means of which the overboiling of liquids is prevented.

Other objects will appear hereinafter.

In the accompanying drawing, Figure 1 is a view in section of a cooking vessel and a lid therefor constructed in accordance with the principles of my invention; Fig. 2 is a top view of a portion of the lid, and Fig. 3 is a sectional view of a modified form of lid or cover.

Most lids which are designed for the prevention of the overboiling of liquids do not actually accomplish this result for the reason that if two openings are made in a cover at different elevations from each other the overboiling liquid will first exude through the lowermost opening and will then rise and exude through the uppermost opening so that if the substance within the vessel is violently agitated by heat the overboiling portion of the liquid will exude simultaneously from all of the openings. The applicant overcomes this difficulty by providing a central float-controlled opening which, under normal conditions, will permit the passage of steam or vapors but if the liquid tends to boil out of the vessel the first action will be to raise the float closing the central and lowermost aperture whereupon the liquid seeks outlet through openings provided in the periphery of the lid from which they are led to the central depression, and overweighting the float are deposited through the central opening into the liquid below, thereby returning the liquid to the vessel and though not preventing the liquid from boiling it prevents the liquid from overflowing the sides of the vessel so that none of the liquid is lost. The returned liquid seems to have a cooling, or at least a settling effect upon the liquid still in the vessel, and as the operation is intermittent and not continuous none of the liquid is lost by overflowing the sides of the vessel.

Referring now more particularly to the drawing, the numeral 5 designates generally a boiling or cooking vessel which, in the present exemplification of my invention, is provided with handles 6 and an upper flange portion 7. On the inside of the flange portion is a ridge 8 which may be intermittent or continuous, and slightly above the ridge at spaced distances are projections 9 which may be secured to or formed integral with the vessel itself.

A lid or cover 10 comprises a piece of sheet material with peripheral perforations 11 and with a depressed central portion having a central perforation 12 and projections 13 adjacent this perforation, preferably formed from the material and extending downwardly at the edges of the perforation 12.

The periphery of the lid is provided with notches 14 at spaced distances therein by means of which the lid may be inserted from the top of the vessel over the projections 9 against the ridge 8. When thus positioned the cover is given a slight turn which binds it firmly to the vessel 5. A handle 15 is secured to the lid for the purpose of attaching or detaching it from the cover and also for carrying the vessel, if desired.

A cage 16 is preferably secured detachably to the under side of the lid 10 by means of flanges 17 on the cage and projections 18 on the cover. This cage has sides 19 which converge toward the bottom where there is an opening 20 preferably smaller than the perforation 12 in the lid member 10.

Disposed within the cage and limited in its movement by the cage and the cover is a float 21 which is larger than the opening 20 but smaller than the perforation 12. Secured to the float is an extending flange 22, the outer edge of which is rounded downwardly and formed with teeth 23. This float member moves freely up and down in the cage 16, the upward movement being limited by the projections 13 of the cover 10, in which position the float and flange substantially close the perforation 12 in the cover. In its lowermost position the outer edges or tips of the teeth 23 engage the converging sides 19 of the cage 16 so that the float 21 is held slightly above the opening 20 at the bottom of the cage so that this opening is never entirely closed. Thus the liquid from within the vessel can enter the opening 20 at the bottom of the cage to raise the float and by means of its flange to substantially close the perforation 12. This will cause the rising liquid to seek another outlet which will cause it to exude through the perforations 11 at the periphery of the lid. The liquid will then run down the inclined upper surface of the lid filling the depression which, when the float is raised, forms a reservoir at the center of the lid and when there is sufficient liquid collected therein its weight upon the float 21 and its flange will cause the float to fall, thereby allowing the liquid to pass through the aperture 12 and discharging it through the bottom opening 20 of the cage 16 into the vessel below.

The liquid thus discharged seems to have a cooling effect upon the other liquid and will slightly retard the boiling action. Thus the operation of raising the float boiling through the peripheral apertures and returning the liquid through the float-controlled opening may be said to be intermittent. Unless the liquid is boiling vigorously the return of liquid through the float-controlled opening will materially retard the boiling. It is obvious, of course, that the frequency of the intermittent action will depend upon the vigor of boiling of the liquid.

In the form shown by Fig. 3 a lid 24 is provided with peripheral openings 25, a central opening 26 and intermediate perforations 27. This lid also has projections 13' extending from the opening 26. Detachably secured to the under side of this lid is a casing 28 and detachably secured to the casing is a cage 29. A float 30 having a flange 31 similar to the float and flange shown in Fig. 1 is contained and limited in its movement within the cage, the flange 31 striking the projection of the casing 28 and substantially closing an opening 32 at the bottom of this casing. This forms a reservoir between the casing 28 and the lid 24 which, as before, is substantially closed at its bottom, the float 30 being slightly spaced from the opening 26 by means of the projections 13'. The object of this construction is to form a reservoir but the action is substantially the same as in the form shown by Fig. 1.

It is also desirable to provide a cover of this kind with a screen 33, as shown in Fig. 3, so that when boiling clothes or other material they may be prevented from exuding from the various openings.

What I claim is:

1. A lid of the class described having a central perforated depression with peripheral perforations through which the over-boiling liquid passes, and float-controlled means for substantially closing the perforation of the depression, said means comprising a flange extending from the float and depending projections on the lid.

2. The combination with a cooking vessel, of a lid therefor having a central perforated depression and perforations at the periphery for over-boiling liquid, a float to substantially close the opening, and means to confine and limit the movement of the float, the float having a flange and the lid having projections engaged by the flange in the raised position of the float.

3. In a non-overboiling lid for cooking vessels, the combination of a cover member having a central depression with a perforation therein, a float having a depending flange adapted to substantially cover the perforation, and a cage supported by the cover member having a perforation at the bottom and adapted to confine and limit the movement of the float.

4. In a non-overboiling lid for cooking vessels, the combination of a cover member having a central depression with a perforation therein, a float having a depending flange adapted to substantially cover the perforation, and a cage having a bottom perforation and a converging lower portion by means of which the float is confined and limited in its movement, the flange of the float engaging the converging portion of the cage and preventing the float from closing the lower opening of the cage.

5. In a non-overboiling lid for cooking vessels, a float having a toothed flange depending therefrom, and a cage for the float secured to the lid having a converging perforated bottom, the float being larger than the bottom but being held from closing the bottom by the engagement of the teeth of the flange with the converging bottom of the cage.

6. In a non-overboiling lid for cooking vessels, a cover member having a central perforation with projections therefrom, and a float with an extending flange adapted to be raised by an overboiling liquid so that the flange of the float engages the said projections and substantially closes the said perforations.

7. In a non-overboiling lid for cooking vessels, the combination with a cover member having a perforated edge and a central depression with a perforation in the bottom, of a float having an extending flange adapted to substantially close the perforation, and a cage attachable to the cover member having a bottom perforation, the lower portion of the sides converging toward the bottom forming a support engaged by the flange of the float, the float moving freely in the cage.

In testimony whereof I have signed my name to this specification, in the presence of two subscribing witnesses, on this 13th day of July, A. D. 1915.

OTTO R. BERGER.

Witnesses:
A. J. CRANE,
CHARLES H. SEEM.